United States Patent

Vosbikian

[11] Patent Number: 5,894,625
[45] Date of Patent: Apr. 20, 1999

[54] MOP ROLLER WRINGER

[75] Inventor: Samuel Vosbikian, Medford, N.J.

[73] Assignee: Quickie Manufacturing Corporation, Cinnaminson, N.J.

[21] Appl. No.: 09/085,605

[22] Filed: May 27, 1998

[51] Int. Cl.$^6$ ........................................... A47L 13/144
[52] U.S. Cl. ................................................. 15/119.1
[58] Field of Search ......................... 15/116.1, 119.1

[56] References Cited

U.S. PATENT DOCUMENTS

| | | | |
|---|---|---|---|
| 1,384,555 | 7/1921 | Cunningham | 15/119.1 |
| 2,820,232 | 1/1958 | Vosbikian et al. | 15/119.1 |
| 3,020,574 | 2/1962 | Vosbikian et al. | 15/119.1 |
| 3,072,943 | 1/1963 | Cone | 15/119.1 |
| 3,089,171 | 5/1963 | Vosbikian et al. | 15/119.1 |
| 3,150,400 | 9/1964 | Fungaroli | 15/119.1 X |
| 4,164,800 | 8/1979 | Strahs | 15/119.1 |
| 4,809,387 | 3/1989 | Nakamura et al. | 15/119.1 |
| 5,675,857 | 10/1997 | Hirse | 15/119.1 |
| 5,724,694 | 3/1998 | Lewis | 15/119.1 |

*Primary Examiner*—Mark Spisich
*Attorney, Agent, or Firm*—Stuart M. Goldstein

[57] ABSTRACT

A mop with a cleaning head consisting of a plurality of fluid absorbent material strands connected to a handle. A wringer rod is connected at one end to a slideable, manually operated sleeve located around the handle. The rod is pivotally connected at its other end to a roller wringer. The roller wringer is of ringed or closed polygon configuration, taking its shape from a flexibly biased support member. The support member is preferably a solid rod formed in a rectangular or other polygonal shape. The support member passes through roller elements positioned one on each of the sides of the member and completely surrounding it. As the sleeve is manually pushed down the handle, the roller wringer is forced over the mop head strands, causing the support member and rollers to expand around the strands. The biased nature of the support member ultimately causes the rollers to compress the strands, squeezing the strands and moisture from them. When the roller wringer has reached the end of the mop head strands, it pivots up. Manual movement of the sleeve back up the handle towards the user draws the roller wringer over the mop head and back to the lower end of the handle. The wringer then pivots down and, through an opening in the support member, it can be repositioned on handle.

22 Claims, 2 Drawing Sheets

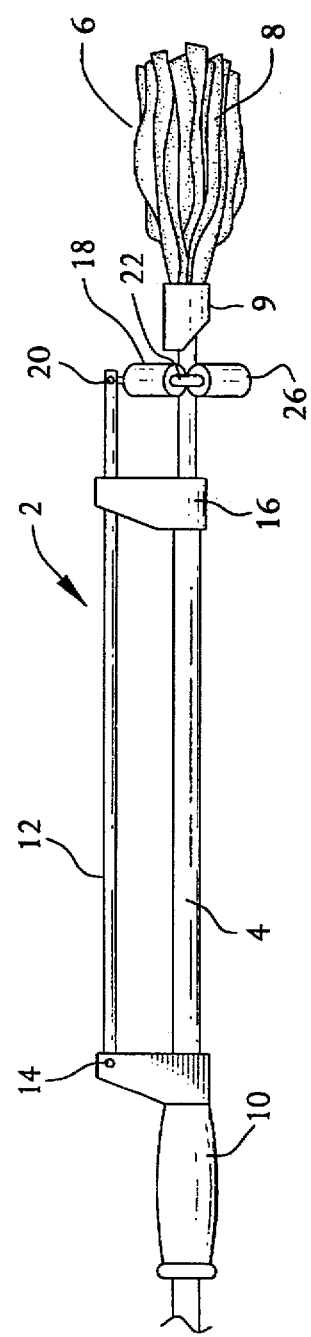
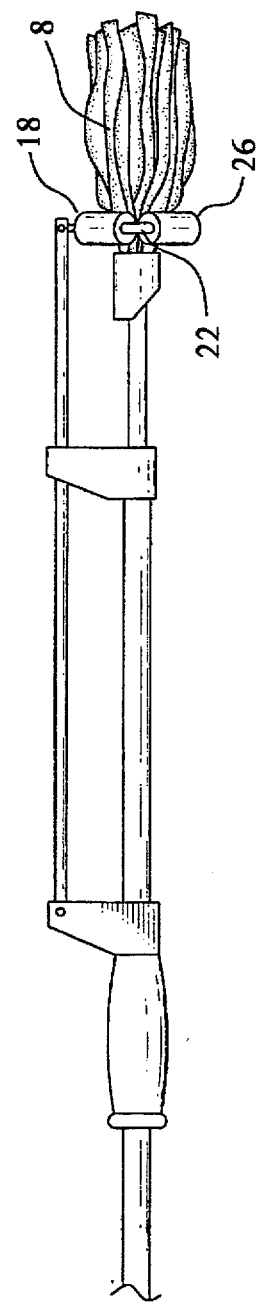
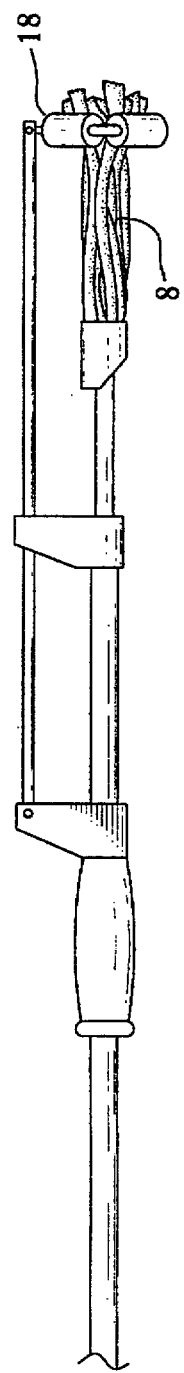
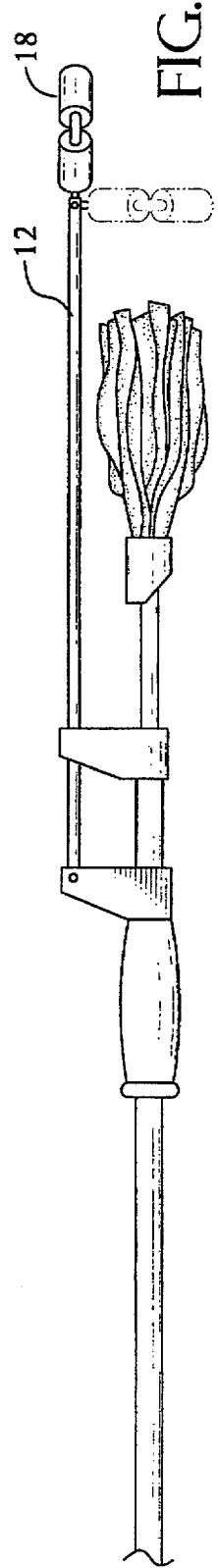
FIG. 1
FIG. 2
FIG. 3
FIG. 4

5,894,625

MOP ROLLER WRINGER

BACKGROUND OF THE INVENTION

Mops have long been used as effective tools for a variety of cleaning applications. Their use for cleaning floor surfaces and for mopping and absorbing liquid from surfaces is well known. One such common mop consists of a cleaning head with a plurality of strands made of cotton, cloth, sponge-plastic, or other fluid absorbent material. An elongated handle is normally attached to one end of the cleaning head.

Mops of this type work very well when their cleaning head strands are dry. However, the mop becomes ineffective when the strands become saturated with fluid. To remedy this problem, various mops with wringer devices have evolved with features which cause the strands to be wrung out, compressed, and squeezed of fluid. For instance, U.S. Pat. No. 5,675,857 employs the use of a sleeve to wring out moisture from a mop's cleaning head. U.S. Pat. Nos. 5,724, 694 and 4,809,387, disclose sleeves in combination with rollers. U.S. Pat. No. 2,820,232 simply shows the use of rollers to squeeze wet mop strand elements. These prior devices, however, have a number of disadvantages. For instance, the wringers used on these mops have either cumbersome sleeve arrangements or are highly mechanized devices. Significantly they are inefficient for the purposes for which they were designed. Many of the devices do not provide sufficient uniform pressure to the mop head strands to wring a substantial amount of the moisture from the mop head.

U.S. Pat. Nos. 3,089,171, and 4,164,800 employ a solid annular ring attached to a support rod to apply pressure completely around the mop head. But since the ring is rigid, it also does not apply enough compressive force to fully wring dry the strands of the head. Further, the internal surfaces of the ring offer substantial resistence as the ring travels down the strands of the mop head. This makes it more difficult to move the ring all the way to the end of the mop head. In addition, the flapper on the bottom of the ring, designed to allow repositioning of the ring over the mop handle when it is pulled toward the user, is inefficient and prone to dysfunction and breakage, upon extended use.

SUMMARY OF THE INVENTION

It is thus the object of the present invention to overcome the limitations and disadvantages of prior hand mop ringing devices.

It is another object of the present invention to provide a wringer for a hand mop with a plurality of strands of fluid absorbent material which is easy and simple to use.

It is still another object of the present invention to provide a wringer for a hand mop which efficiently, easily, and fully wrings moisture from the mop.

It is a further object of the present invention to provide a wringer for a hand mop which uses biased rollers to compress and wring moisture from the mop strands to their full extent with little resistance and hence less difficulty.

It is still a further object of the present invention to provide a wringer for a hand mop which can quickly and easily be pulled toward the user and be repositioned over the mop handle after the wringing operation is completed.

The present invention comprises a mop with a cleaning head consisting of a plurality of fluid absorbent material strands connected to a handle. A wringer rod is connected at one end to a slideable, manually operated sleeve located around the handle. The rod is pivotally connected at its other end to a roller wringer. The roller wringer is of ringed or closed polygon configuration, taking its shape from a flexibly biased support member. The support member is preferably a solid rod formed in a rectangular or other polygonal shape. The support member passes through roller elements positioned one on each of the sides of the member and completely surrounding it. As the sleeve is manually pushed down the handle, the roller wringer is forced over the mop head strands, causing the support member and rollers to expand around the strands. The biased nature of the support member ultimately causes the rollers to compress the strands, squeezing the strands and moisture from them. When the roller wringer has reached the end of the mop head strands, it pivots up. Manual movement of the sleeve back up the handle towards the user draws the roller wringer over the mop head and back to the lower end of the handle. The wringer then pivots down and, through an opening in the support member, it can be repositioned on handle.

The novel features which are considered as characteristic of the invention are set forth in particular in the appended claims. The sponge mop roller wringer itself, however, both as to its design, construction, and use, together with additional features and advantages thereof, are best understood upon review of the of the following detailed description with reference to the accompanying drawings.

BRIEF DESCRIPTION OF THE DRAWINGS

FIG. 1 is an elevation view of the mop showing the roller wringer in position around the handle during the mop's use mode.

FIG. 2 is an elevation view of the mop showing the roller wringer around the upper section of the mop head, as it begins its path over the head.

FIG. 3 is an elevation view of the mop showing the roller wringer near the end of the mop head.

FIG. 4 is an elevation view of the mop showing the roller wringer free of the mop head, pivoted up just prior to it being withdrawn toward the handle to return to the position shown in FIG. 1.

DETAILED DESCRIPTION OF THE INVENTION

Figure 5:
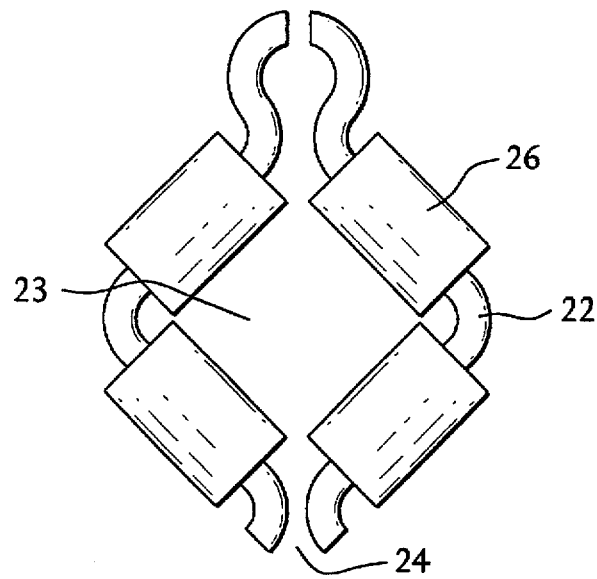
FIG. 5 is an end view of the roller wringer of the preferred embodiment of the invention.

Mop 2 comprises handle 4 and mop head 6. Mop head 6 has a plurality of absorbent material strands 8 for mopping, cleaning, moisture absorbency, and similar functions. Spreader 9 is located at the end of handle 4, near strands 8. Sleeve 10 is configured to surround handle 4, and is manually slideable up and down the handle. Wringer rod 12 is connected to sleeve 10 at connection point 14. Rod 12 is guided for slideable movement over handle 4 by rod support 16. Roller wringer 18 is pivotally connected to rod 12 at point 20.

Figure 6:
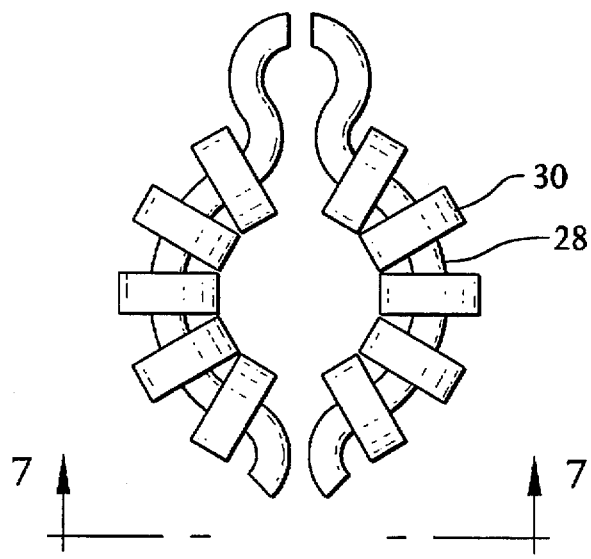
FIG. 6 is an end view of another embodiment of the invention.
Figure 7:
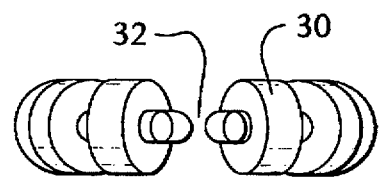
FIG. 7 is a side view of the embodiment in FIG. 6.

Roller wringer 18 is comprised of a closed polygonal shaped rod support member 22, with center opening 23. While support member 22 provides a measure of rigidity, it is made of a material which allows it flexibility and resiliency or bias. A slight bottom opening 24 is located at the bottom of support member 22. Bottom opening 24 can be resiliently expanded to allow handle 4 to be positioned through the opening and within center opening 23 of roller wringer 18. The resiliently biased nature of support member 22 allows for the expansion of opening 24. Support member 22 in FIG. 5 is shown as being rectangular. However it can be formed as any geometric, polygonal shape with multiple sides, including a triangle or even an annular ring, such as is shown in FIGS. 6 and 7. The roller wringer in this embodiment uses an annular support member 28 rollers 30 and bottom opening 32.

Support member 22, in the embodiment shown in FIGS. 1–5, passes through a plurality of roller elements 26. In the preferred embodiment, one roller element 26 is positioned around each of the sides of support member 22, so that the roller elements extend substantially around the entire perimeter of the support member.

Roller wringer 18, as shown in FIG. 1, is in position surrounding handle 4 to allow mop 2 to be used for cleaning, mopping, etc. In order to wring moisture out of strands 8 of mop 2, sleeve 10 is pushed down handle 4. This causes rod 12 to move roller wringer 18 towards spreader 9, where rollers 26 are caused to expand slightly outward. As roller wringer 18 is moved toward mop head 6, it contacts strands 8, as shown in FIG. 2, where biased support member 22 allows rollers 26 to expand over the strands, while still maintaining the rigidity and shape of the wringer.

As sleeve 10 continues to move roller wringer 18 down over mop strands 8, rollers 26 continue to expand and compress the strands. As a result of the bias nature of support member 22, rollers 26 apply a compressive, squeezing force, uniformly around the strands. When roller wringer 18 has reached the end of mop head 6 as shown in FIG. 3, all strands 8 have been uniformally squeezed of moisture. As shown in FIG. 4, when the wringer comes off strands 8, it pivots up on wringer rod 12.

Manual movement of sleeve 10 back up handle 4 in the direction of the user draws rod 12 and hence roller wringer 18 back towards the end of the handle. When over handle 4, roller wringer 18 pivots down toward the handle. Opening 24 allows roller wringer 18 to be repositioned so that it surrounds handle 4, with the handle through center opening 23, as in FIG. 1. Roller wringer 18 is now ready to be used after the mopping process again saturates strands 8.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

What is claimed:

1. A mop comprising:
   (a) a handle;
   (b) a plurality of fluid absorbent material mopping elements secured at one end of the handle;
   (c) a wringer arm connected to the handle;
   (d) a wringer element pivotally connected to the arm, said wringer element comprising:
       (1) flexible biased roller support means for maintaining the shape of the wringer element and for applying compressive force to the mopping elements, said support means being of substantially polygonal configuration and comprising a resiliently expandable opening means to allow positioning of the mop handle through the wringer element, and
       (2) roller means extending substantially around the entire perimeter of the support means, whereby movement of the mopping elements through the roller means causes outward expansion of the flexible biased roller support means and the roller means and uniform, circumferential compressive force around the mopping elements.

2. A mop as described in claim 1 in which the support means extends through the roller means.

3. A mop is described in claim 1 in which the roller means comprises multiple roller elements.

4. A mop as in claim 1 in which the support means has multiple linear sides.

5. A mop as in claim 4 in which the roller means comprises multiple roller elements.

6. A mop as in claim 5 in which each side of the support means extends through one roller element.

7. A mop as in claim 5 in which the support means is of four sided rectangular configuration.

8. A mop as in claim 7 in which each side of the support means extends through one roller element.

9. A mop as in claim 1 in which the support means has four linear sides.

10. A mop as in claim 1 in which the support means is of four sided rectangular configuration.

11. A mop as described in claim 1 in which the support means comprises a resilient rod member.

12. A wringer element for use on a mop having a plurality of absorbent material mopping elements and a handle with a wringer arm pivotally connected to the wringer element, said wringer element comprising:
   (1) flexibly biased roller support means for maintaining the shape of the wringer element and for applying compressive force to the mopping elements, said support means being of substantially polygonal configuration and comprising a resiliently expandable opening means to allow positioning of the mop handle through the wringer element, and
   (2) roller means extending substantially around the entire perimeter of the support means, whereby movement of the mopping elements through the roller means causes outward expansion of the flexible biased roller support means and the roller means and applies uniform, circumferential compressive force around the mopping elements.

13. A wringer element as described in claim 12 in which the support means extends through the roller means.

14. A wringer element is described in claim 12 in which the roller means comprises multiple roller elements.

15. A wringer element as in claim 12 in which the support means has multiple linear sides.

16. A wringer element as in claim 15 in which the roller means comprises multiple roller elements.

17. A wringer element as in claim 16 in which each side of the support means extends through one roller element.

18. A wringer element as in claim 16 in which the support means is of four sided rectangular configuration.

19. A wringer element as in claim 18 in which each side of the support means extends through one roller element.

20. A wringer element as in claim 12 in which the support means has four linear sides.

21. A wringer element as in claim 12 in which the support means is of four sided rectangular configuration.

22. A wringer element as described in claim 12, in which the support means comprises a resilient rod member.

* * * * *